United States Patent

Choi et al.

[11] Patent Number: 6,031,067
[45] Date of Patent: Feb. 29, 2000

[54] SOLUBLE POLYIMIDE RESIN AND PROCESS OF PREPARATION OF THE SAME

[75] Inventors: Kil-Yeong Choi; Mi-Hie Yi, both of Daejeon, Rep. of Korea; Wenxi Huang, Changchun, China

[73] Assignee: Korea Research Institute of Chemical Technology, Rep. of Korea

[21] Appl. No.: 09/086,387

[22] Filed: May 29, 1998

[30] Foreign Application Priority Data

May 29, 1997 [KR] Rep. of Korea ....................... 97-21577

[51] Int. Cl.[7] ............................. C08G 73/10; C08G 69/26
[52] U.S. Cl. ......................... 528/353; 528/125; 528/128; 528/171; 528/172; 528/173; 528/174; 528/175; 528/179; 528/183; 528/185; 528/188; 528/220; 528/229; 528/350
[58] Field of Search .................................. 528/353, 125, 528/128, 171, 172, 173, 174, 175, 179, 183, 185, 188, 220, 229, 350

[56] References Cited

U.S. PATENT DOCUMENTS

| | | | |
|---|---|---|---|
| 5,521,276 | 5/1996 | Choi et al. | 528/322 |
| 5,610,265 | 3/1997 | Tan | 528/353 |
| 5,686,558 | 11/1997 | Kitamura et al. | 528/353 |
| 5,731,404 | 3/1998 | Auman et al. | 528/353 |
| 5,783,656 | 7/1998 | Kimura et al. | 528/173 |
| 5,807,961 | 9/1998 | Sawai et al. | 528/170 |

*Primary Examiner*—P. Hampton-Hightower

[57] ABSTRACT

The invention herein relates to a soluble polyimide resin and the process of preparation of the same, wherein aromatic tetracarboxylic dianhydride and aromatic diamine having an alicyclic group with various structures of substituted alkyl groups are used to yield a novel form of a polyimide resin, which has superior heat-resistance, solubility and transparency.

More specifically, the invention herein relates to a novel polyimide resin having excellent heat-resistance and solubility, which is prepared by means of reacting aromatic diamine monomers having a novel chemical structure with various types of aromatic tetracarboxilic acid dianhydrides, in stead of aromatic diamine used for the preparation of the conventional polyimide resin. As a result, the polymers so obtained had the glass transition temperature of 250° C.~400° C. and showed a increase in solubility in proportion to the increase in volume of the alkyl group. Further, the polymers herein showed superior solubility at room temperature in various types of organic solvents, e.g., THF.

6 Claims, No Drawings

SOLUBLE POLYIMIDE RESIN AND PROCESS OF PREPARATION OF THE SAME

FIELD OF THE INVENTION

The invention herein relates to a soluble polyimide resin and the process of preparation of the same, wherein aromatic tetracarboxylic dianhydride and aromatic diamine having an alicyclic group with various structures of substituted alkyl groups are used to yield a novel form of a polyimide resin having the repetitive unit of the formula 1 as below, which has superior heat-resistance, solubility, and transparency:

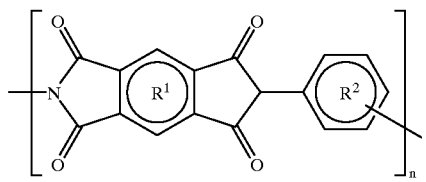
(1)

wherein:  $R^1$ represents one or more of tetravalent groups selected from the following:

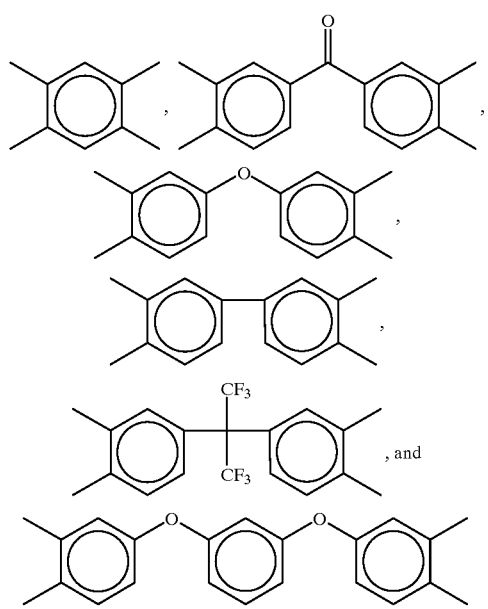

, and

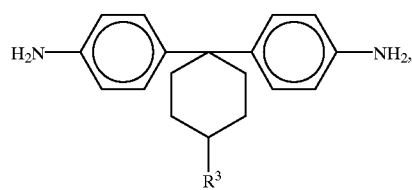

$R^2$ must include one or more of substituted cyclohexylidene dianiline groups as represented by

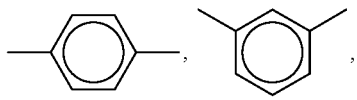

and may contain the following bivalent group,

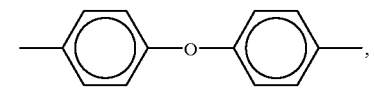

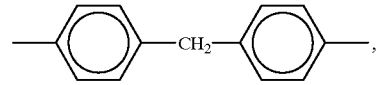

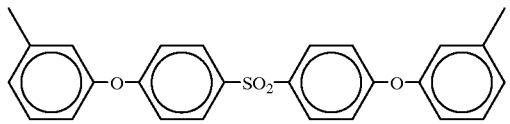

and

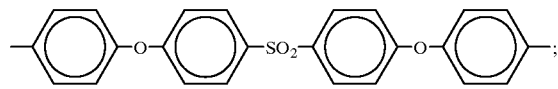

wherein, $R^3$ represents an alkyl group of $C_1$~$C_6$ with linear or branched structures, phenyl group, or phenyl group substituted with the alkyl group of $C_1$~$C_6$ with linear or branched structures.

BACKGROUND OF THE INVENTION

In general, a polyimide (hereinafter referred to as "PI") resin denotes a high heat-resistant resin which is manufactured by condensation polymerization of aromatic tetracarboxylic acid or the derivatives thereof with aromatic diamine, or aromatic diisocyanate followed by imidization. However, the PI resin is insoluble in solvent and non-meltable by heat.

Further, the PI resin can have a variety of molecular structures depending on the types of the monomers thereof. As for the aromatic tetracarboxylic acid constituent, pyromellitic dianhydride (PMDA) or biphenyltetracarboxylic dianhydride (BPDA) are used herein. As for the aromatic diamine constituent, oxydianiline (ODA) or p-phenylene diamine (p-PDA) are used for condensation polymerization. The typical PI resin has a repetitive unit of the following formula

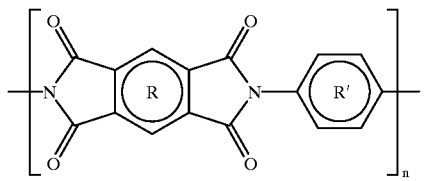
(10)

The PI resin with the formula 10 as repetitive unit is high heat-resistant, insoluble, and non-meltable with the following properties:

(1) excellent heat-resistance oxidation property;
(2) superior heat-resistance based on the utilization at high temperature, i.e., 260° C. for a long-term use, and 480° C. for a short-term use;
(3) excellent electrochemical and mechanical properties;
(4) excellent radiation resistance and low temperature properties;
(5) intrinsic non-combustible properties; and
(6) excellent chemicals-resistant properties.

In spite of the fact that the PI resin with formula 10 as repetitive unit possesses an excellent heat resistance property, the processing therein is extremely difficult due to insolubility and non-melting property.

To overcome the shortcomings of the PI resin, several methods have been devised: a) method of introducing polar groups into the backbone or side chains of the polymer, b) method of introducing the connecting groups or pendant groups with a large volume into the polymer, and c) method of enhancing the flexibility of the backbone of the polymer.

In particular, as part of research to enhance the solubility of the PI resin, T. Kurosaki et al. reported a method of preparing a soluble PI using alicyclic anhydride as a monomer (Macromolecules, 1994, 27, 1117 and 1993, 26, 4961). Also Qn Jin et al. disclosed in 1993 a method of preparing a soluble PI resin using the cyclic diamine (J.P.S. Part A. Polym. Chem. Ed., 31, 2345~2351).

The soluble PI resins as modified by the aforementioned methods have witnessed better solubility due to enhanced flexibility of the chains. However, the actual use thereof seems to be problematic since the high thermal stability and mechanical characteristics, which are advantages of the conventional PI resin, are seriously affected thereby.

To overcome such shortcomings, the inventors herein have for several years conducted intensive studies to improve the solubility and melting property of the polyimide resin, a typical thermoplastic and high heat-resistance resin, for improvement in the processability of the conventional aromatic high heat-resistance polymers. As a result, the inventors have discovered that the solubility of a polymer can be significantly enhanced by introducing isophorone diamine (hereinafter referred to as "IPDA"), an aliphatic diamine compound containing trimethylcyclohexyl group, into the backbone of polymer (U.S. Pat. No. 5,521,276).

Further, the inventors have endeavored to prepare a soluble PI resin with better thermal resistance than the conventional PI resin with IPDA. As a result, the inventors have succeeded in preparing a variety of homo- and co-PIs with enhanced physical properties, using aromatic diamine compounds containing trimethylcyclohexyl group (e.g., trimethylcyclohexylidene dianiline: hereinafter referred to as "TMCH-DA") as a monomer (Korean Patent Application No. 97-2811).

Based on the above studies, the inventors have significantly increased the solubility and thermal resistance of a polymer by introducing various substituents into the cyclohexylidene group instead of a methyl group in the trimethylcyclohexylidene group, which is a connecting group between the two phenyl groups of the TMCH-DA.

SUMMARY OF THE INVENTION

The inventors have completed this invention based on the manufacture of a novel PI resin with excellent thermal resistance and solubility in such a manner that instead of aromatic diamine used for the manufacture of the conventional PI resin, aromatic diamine with a novel structure is introduced therein. Thereafter, such compound is reacted with various types of aromatic tetracarboxylic dianhydrides.

Therefore, the objective of this invention is to provide a novel soluble PI resin with excellent processability such as solubility and moldability while maintaining the basic properties of the conventional PI resin, which may be used as a core heat-resistance material in a variety of advanced industries such as electronics and aerospace.

DETAILED DESCRIPTION OF PREFERRED EMBODIMENTS

The invention herein is characterized by a polyimide resin having the following formula 1 as repetitive unit:

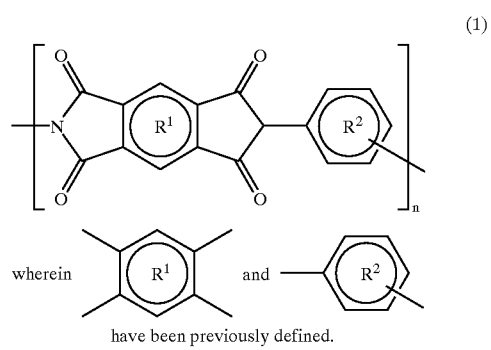

have been previously defined.

Further, the invention herein relates to a process of manufacturing a polyimide resin having aforementioned formula 1 as repetitive unit, derived from solution polymerization of aromatic tetracarboxylic dianhydride and aromatic diamine compounds.

With respect to the above manufacturing process, said aromatic tetracarboxylic dianhydride may include one or more aromatic tetracarboxylic acids of the following group consisting of pyromellitic dianhydride (PMDA), benzophenonetetraboxylic dianhydride (BTDA), oxydiphthalic dianhydride (ODPA), biphenyltetracarboxylic dianhydride (BPDA), hexafluoroisopropylidene diphthalic dianhydride (HFDA), and hydroquinonebisphthalic dianhydride (HQDPA).

As for said aromatic diamine compound, it contains one or more of cyclohexylidenedianiline derivatives substituted with formula 2 as an essential component and may contain one or more compounds selected from the group consisting of oxydianiline, methylene dianiline, metabisaminophenoxy diphenylsulfone, and parabisaminophenoxy diphenylsulfone.

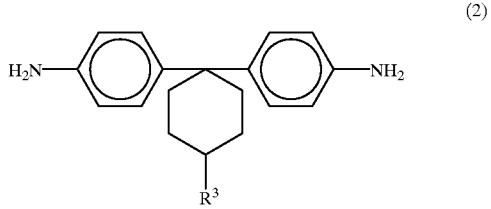

wherein: $R^3$ represents an alkyl group of $C_1 \sim C_6$ with linear or branched structures, phenyl group, or phenyl group substituted with the alkyl group of $C_1 \sim C_6$ with linear or branched structures.

The invention herein is explained in more detail as set forth hereunder. The invention relates to a PI resin having the repetitive unit of formula 1 and the process of the preparation thereof, comprising aromatic diamine compounds having a cyclohexylidenedianiline substituted with formula 2 as essential component, such as 4-methylcyclohexylidenedianiline (MECHDA), 4-ethylcyclohexylidenedianiline (ETCHDA), 4-t-butylcyclohexylidenedianiline (TBCHDA), 4-amylcyclohexylidenedianiline (AMCHDA), and 4-phenyl substituted cyclohexylidenedianiline (PHCHDA).

The PI resin of the invention herein has a weight average molecular weight (MW) of about 50,000~200,000 g/mol. The inherent viscosity thereof is in the range of 0.5~2.0 dL/g. The glass transition temperature (Tg) thereof is in the range of 250~400° C.

Also, the PI resin under said invention is easily dissolvable at room temperature not only in aprotic polar solvents such as dimethylacetamide (DMAc), dimethylformamide (DMF), N-methyl-2-pyrrolidone (NMP), but also in organic solvents such as acetone, ethyl acetate, m-cresol. At room temperature, it demonstrates a high solubility of more than 10 wt % in a solution having a low boiling point, such as tetrahydrofuran (THF) and chloroform, and in a low water absorptive solvent such as γ-butyrolactone.

The following examples illustrate various aspects of the invention herein but are not to be construed to limit the claims in any manner whatsoever.

EXAMPLE 1

To a 50 ml reactor equipped with a mechanical stirrer, thermometer, nitrogen-inlet, dropping funnel and condenser, nitrogen gas was slowly influxed as 4-methylcyclohexylidenedianiline (hereinafter referred to as "MECHDA": 2.80 g, 0.01 mole) was dissolved in 36 ml of dimethylacetamide (hereinafter referred to as "DMAc"). Thereafter, pyromellitic dianhydride (hereinafter referred to as "PMDA": 2.18 g, 0.01 mole) in solid phase was slowly added to the reacting mixture. At this point, the solid content was fixed to 15 wt %, and the reaction temperature was increased to 70° C. for 2 hours. Further, with the temperature increased up to reflux temperature, the reacting mixture was stirred for 6~12 hours. During these reactions, isoquinoline (1~5 wt %) was employed as a catalyst. After the reaction was completed, the mixture was precipitated in excess amount of methanol (hereinafter referred to as "MeOH") using a waring blender. The polymer was washed with water and MeOH several times and was dried under reduced pressure at 120° C. to yield a novel PI resin (hereinafter referred to as "P-1"). The yield of polymerization was quantitative. The inherent viscosity measured in m-cresol at 30° C. at the concentration of 0.5 g/dL was 1.18 dL/g.

EXAMPLE 2

A mixture of 4-ethylcyclohexylidenedianiline (ETCHDA: 2.94 g, 0.01 mole) and PMDA (2.18 g, 0.01 mole) was dissolved in m-cresol and using the same procedure as described in the example 1. The PI(P-2) resin so prepared was dissolved in m-cresol at the concentration of 0.5 g/dL, and the inherent viscosity measured at 30° C. was 1.27 dL/g.

EXAMPLE 3

A mixture of 4-t-butylcyclohexylidenedianiline (hereinafter referred to as "TBCHDA": 3.22 g, 0.01 mole) and PMDA (2.18 g, 0.01 mole) was dissolved in m-cresol, and using the same procedure as described in the example 1, a PI resin (hereinafter referred to as "P-3") was synthesized. The PI resin so prepared was dissolved in m-cresol at the concentration of 0.5 g/dL, and the inherent viscosity measured at 30° C. was 0.93 dL/g.

EXAMPLE 4

A mixture of 4-amylcyclohexylidenedianiline (hereinafter referred to as "AMCHDA": 3.36 g, 0.01 mole) and PMDA (2.18 g, 0.01 mole) was dissolved in m-cresol, and using the same procedure as described in the example 1, a PI resin (hereinafter referred to as "P-4") was synthesized. The PI resin so prepared was dissolved in m-cresol at the concentration of 0.5 g/dL, and the inherent viscosity measured at 30° C. was 1.24 dL/g.

EXAMPLE 5

A mixture of 4-phenyl substituted series cyclohexylidenedianiline (hereinafter referred to as "PHCHDA": 3.40 g, 0.01 mole) and PMDA (2.18 g, 0.01 mole) was dissolved in m-cresol, and using the same procedure as described in the example 1, a PI resin (hereinafter referred to as "P-5") was synthesized. The PI resin so prepared was dissolved in m-cresol at the concentration of 0.5 g/dL, and the inherent viscosity measured at 30° C. was 0.80 dL/g.

EXAMPLE 6

PMDA (2.18 g, 0.01 mole) was added to a mixture of ETCHDA (2.21 g, 7.5 mmole) and oxydianiline (hereinafter referred to as "ODA": 0.5 g, 2.5 mmol) dissolved in m-cresol (34 ml) and using the same procedure as described in the example 1, a co-polymerized PI resin (hereinafter referred to as "P-6") was synthesized. The PI resin so prepared was dissolved in m-cresol at the concentration of 0.5 g/dL, and the inherent viscosity measured at 30° C. was 1.32 dL/g.

COMPARATIVE EXAMPLE

In the same procedure as described in the example 1, the reaction was carried out, but the PI resin (hereinafter referred to as "P-7") was synthesized in such a manner that cyclohexylidenedianiline (hereinafter referred to as "CHDA": 2.66 g, 0.01 mole) was reacted with the PMDA (2.18 g, 0.01 mole). The PI resin so prepared was precipitated as a solid form during the reaction, but its insolubility to m-cresol made the measurement of the inherent viscosity unavailable.

EXPERIMENTAL EXAMPLE 1

Measurement of Molecular Weight

As for the PI resins prepared in the examples 1~6 and comparative example, the experimental results on the inherent viscosity and film-forming property by solvent casting are shown in the following table 1.

TABLE 1

| Polymer | Inherent Viscosity (dL/g) | Film Property |
| --- | --- | --- |
| Example 1 (P-1) | 1.18 | Tough |
| Example 2 (P-2) | 1.27 | Tough |
| Example 3 (P-3) | 0.93 | Tough |
| Example 4 (P-4) | 1.24 | Tough |
| Example 5 (P-5) | 0.80 | Tough |
| Example 6 (P-6) | 1.32 | Tough |

The PI resins prepared in the examples 1~6 were all amorphous and transparent. The inherent viscosity of polyimides measured in m-cresol were in the range of 0.5~2.0 dL/g. Further, the properties of films casted from DMAc solution seemed to be excellent. In other words, the diamine monomers of said invention having the bended structure could become polymers with high molecular weights by one-step polyimidization at high temperature.

By contrast, the PI resin prepared in the comparative example had poor solubility so that the measurement of inherent viscosity at m-cresol was impossible.

EXPERIMENTAL EXAMPLE 2

Thermal Analysis

To evaluate the thermal property of the respective PI resins prepared in the examples 1~6 and comparative example, the glass transition temperature and thermal decomposition temperature were measured.

Using the differential scanning calorimeter (DSC), the glass transition temperature was measured based on the secondary heat trace of the DSC measurements with a heating rate of 10° C./min under nitrogen atmosphere. And the thermal decomposition temperature was measured by thermogravimetric analysis (TGA) with a heating rate of 10° C./min under nitrogen atmosphere.

TABLE 2

| | Dianhydride Glass transition temperature (° C.) | | | | | |
|---|---|---|---|---|---|---|
| Diamine | PMDA | BPDA | BTDA | HFDA | ODPA | HQDPA |
| MECHDA | 349 | 355 | 346 | 306 | 300 | 267 |
| ETCHDA | — | 336 | — | — | — | — |
| PHCHDA | — | — | 313 | 312 | 301 | 263 |
| TBCHDA | — | 331 | 318 | 319 | 310 | 276 |
| AMCHDA | 348 | 342 | 318 | 310 | 298 | 261 |

As noted in the above table 2, the novel polymers prepared from this invention usually demonstrated a higher glass transition temperature (Tg) of 250~400° C. although some differences were observed depending on the types of anhydride and substituent. Considering the fact that a typical aromatic PI resin, such as Kapton™ has the glass transition temperature of about 380° C., it can be said that this invention is of great significance. In other words, the PI resin of the invention herein demonstrated more prolonged thermal resistance property which was not inferior to that of Kapton™.

More specifically, the pre-imidized PI resin of the invention herein does not require the post-imidization reaction at high temperature. Further, since the processing temperature can be lowered to the solvent-evaporating temperature (less than 200° C.), the thermal deterioration of peripheral parts may be prevented. Further, the PI resin of the invention herein is effective in reducing voids formation at high temperature, which may contribute much to the expanded application of the PI resin in future.

TABLE 3

| | Dianhydride Thermal decomposition temperature (° C.) | | | | | |
|---|---|---|---|---|---|---|
| Diamine | PMDA | BPDA | BTDA | HFDA | ODPA | HQDPA |
| MECHDA | 520 | 520 | 521 | 523 | 523 | 530 |
| ETCHDA | 512 | 526 | 497 | 516 | 520 | 510 |
| PHCHDA | 480 | 507 | 500 | 505 | 513 | 504 |
| TBCHDA | 519 | 505 | 500 | 523 | 525 | 528 |
| AMCHDA | 511 | 520 | 491 | 530 | 524 | 517 |

According to table 3, the maximum decomposition temperature of the PI resin prepared by the invention was about 500° C., which is relatively high value.

EXPERIMENTAL EXAMPLE 3

Solubility

The solubility of the PI resins according to said invention is represented in the following tables 4 and 5.

TABLE 4

| Solubility of Polyimides Based on Pyromellitic dianhydride | | | | | | | | |
|---|---|---|---|---|---|---|---|---|
| | Solvent Solubility | | | | | | | |
| Diamine | NMP | DMSO | TCE | Dioxane | THF | CHCl$_3$ | CH$_2$Cl$_3$ | Acetone |
| MECHDA | ++ | + | ++ | ++ | -- | -- | -- | -- |
| ETCHDA | ++ | + | ++ | ++ | ++ | ++ | ++ | -- |
| PHCHDA | ++ | + | ++ | ++ | ++ | ++ | ++ | -- |
| TBCHDA | ++ | + | ++ | ++ | ++ | ++ | ++ | -- |
| AMCHDA | ++ | + | ++ | ++ | ++ | ++ | ++ | -- |

TCE: 1,1,2,2-tetrachloroethane
++: soluble, +: soluble by heating, +−: partially soluble, −−: insoluble As noted in the above table 4, the PI resin of said invention exhibited excellent solubility behavior toward various organic solvents. As shown in table, the PI resin with rigid structure derived from PMDA was easily dissolved in common organic solvents such as THF at room temperature as well as non-protonic solvents, such as NMP, DMAc and DMF.

TABLE 5

Solubility of Polyimide Based on Hexafluoroisopropylidene diphthalic acid (HFDA)

| Diamine | Dioxane | THF | CHCl$_3$ | CH$_2$Cl$_2$ | MEK | Acetone | EtOAc | Acetonitrile |
|---|---|---|---|---|---|---|---|---|
| CHDA   | ++ | ++ | ++ | ++ | ++ | -- | -- | -- |
| MECHDA | ++ | ++ | ++ | ++ | ++ | ++ | ++ | -- |
| ETCHDA | ++ | ++ | ++ | ++ | ++ | ++ | ++ | -- |
| PHCHDA | ++ | ++ | ++ | ++ | ++ | -- | -- | -- |
| TBCHDA | ++ | ++ | ++ | ++ | ++ | ++ | ++ | -- |
| AMCHDA | ++ | ++ | ++ | ++ | ++ | ++ | ++ | -- |
| TMCHDA | ++ | ++ | ++ | ++ | ++ | ++ | ++ | -- |

++: soluble, +: soluble by heating, +−: partially soluble, −−: insoluble

As noted in table 5, the PI resins prepared by the HFDA with flexible hexafluoroisopropylidene moiety showed an increase in solubility, further demonstrating enhanced solubility in some common organic solvents, such as acetone, methylethylketone (MEK) and ethylacetate (EtOAc).

Consequently, the most of PI resins prepared from various kind of dianhydrides of said invention showed enhanced solubility compared to that of conventional aromatic polyimide. This novel feature is of great importance in expanding the applicability of the PI resins. More specifically, in the case where the PI resin of adhesive material, the fabrication of an PI adhesive layer with completely imidized form at less than 200° C. is available due to its excellent solubility. Further, during the adhesion process via heating, the void formation can be reduced. Therefore the PI resin of said invention may be used as a liquid crystal alignment layer or soluble photosensitive PI resins.

Since the PI resin of the invention herein has the following advantages in that a) the thermal resistance property thereof is excellent with superior solubility and melting property, it may be widely used to heat resistant and insulating layers in electronics requiring a low-temperature processing, as well as to various hi-tech heat-resistant materials.

What is claimed is:

1. A polyimide resin having the following formula (1) as a repetitive unit:

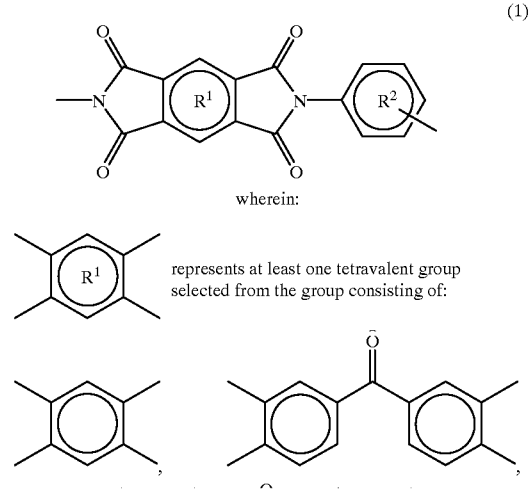

wherein:

R$^1$ represents at least one tetravalent group selected from the group consisting of:

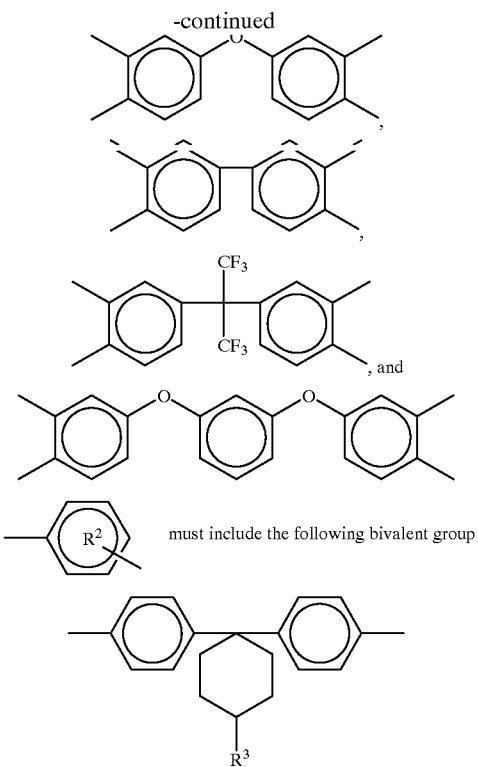

must include the following bivalent group and optionally contains a bivalent group selected from the group consisting of,

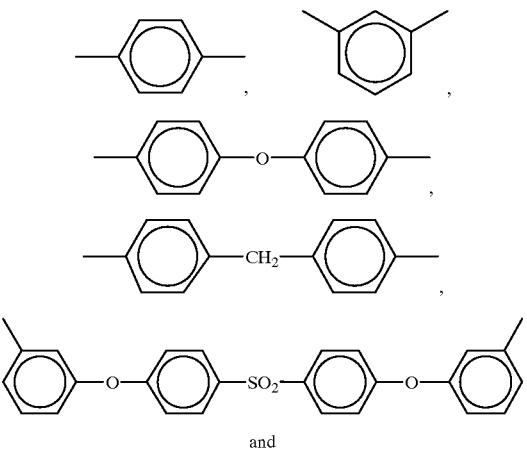

and

-continued

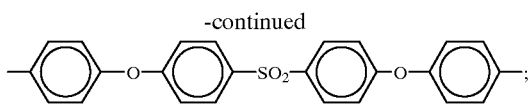

wherein R³ represents a linear or branched $C_1$–$C_6$ alkyl group, or a phenyl group optionally substituted with a linear or branched $C_1$–$C_6$ alkyl group.

2. The polyimide resin according to claim 1, wherein the intrinsic viscosity of the polyimide resin is in the range of 0.5~2.0 dL/g.

3. The polyimide resin according to claim 1, wherein the average molecular weight of the polyimide resin is in the range of 50,000~200,000 g/mol.

4. The polyimide resin according to claim 1, wherein the glass transition temperature of the polyimide resin is in the range of 250~400° C.

5. The polyimide resin according to claim 1, wherein the polyimide resin is soluble at room temperature in a solvent or co-solvent selected from the group consisting of dimethylacetamide, dimethylformamide, N-methyl-2-pyrrolidone, acetone, ethyl acetate, tetrahydrofuran, chloroform, m-cresol, and γ-butyrolactone.

6. A process of preparing a polyimide resin according to claim 1 which comprises solution polymerizing an aromatic tetracarboxylic dianhydride selected from the group consisting of pyromellitic dianhydride (PMDA), benzophenonetetraboxylic dianhydride (BTDA), oxydiphthalic dianhydride (ODPA), biphenyltetracarboxylic dianhydride (BPDA), hexafluoroisopropylidene diphthalic dianhydride (HFDA), and hydroquinonebisphthalic dianhydride (HQDPA) and an aromatic diamine compound consisting essentially of a substituted cyclohexylidene dianiline as represented by the following formula (2)

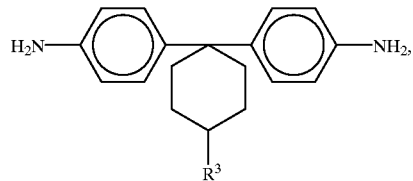

(2)

and optionally comprising a diamine compound selected from the group consisting of oxydianiline, methylene dianiline, metabisaminophenoxy diphenylsulfone, and para-bisaminophenoxy diphenylsulfone.

* * * * *